United States Patent [19]

Beeman et al.

[11] Patent Number: 4,486,627
[45] Date of Patent: Dec. 4, 1984

[54] CABLE LOAD STATUS DETECTOR

[75] Inventors: Robert H. Beeman, Berkeley; Stanley J. Chmura, Elmhurst, both of Ill.

[73] Assignee: GTE Automatic Electric Inc., Northlake, Ill.

[21] Appl. No.: 449,339

[22] Filed: Dec. 13, 1982

[51] Int. Cl.³ .............................................. H04B 3/46
[52] U.S. Cl. ........................... 179/175.3 R; 324/57 SS
[58] Field of Search ................. 179/175.3 R, 175.3 A, 179/175.3 F, 16 F; 324/57 R, 57 SS, 57 O, 57 U; 178/45, 46; 364/482, 481; 371/22; 331/51

[56] References Cited

U.S. PATENT DOCUMENTS 4,087,656  2/1978  Blum et al. .................... 179/175.3 R
4,307,267 12/1981  Peoples .......................... 179/175.3 R Primary Examiner—Stafford D. Schreyer
Attorney, Agent, or Firm—Charles A. Doktycz; Peter Xiarhos

[57] ABSTRACT

An arrangement for monitoring the admittance of a line during a frequency sweep is disclosed which upon detection of the characteristic admittance level determines the loaded or unloaded status of a transmission line. Output logic associated with detection circuits provides a digital indication of the status detected.

10 Claims, 1 Drawing Figure

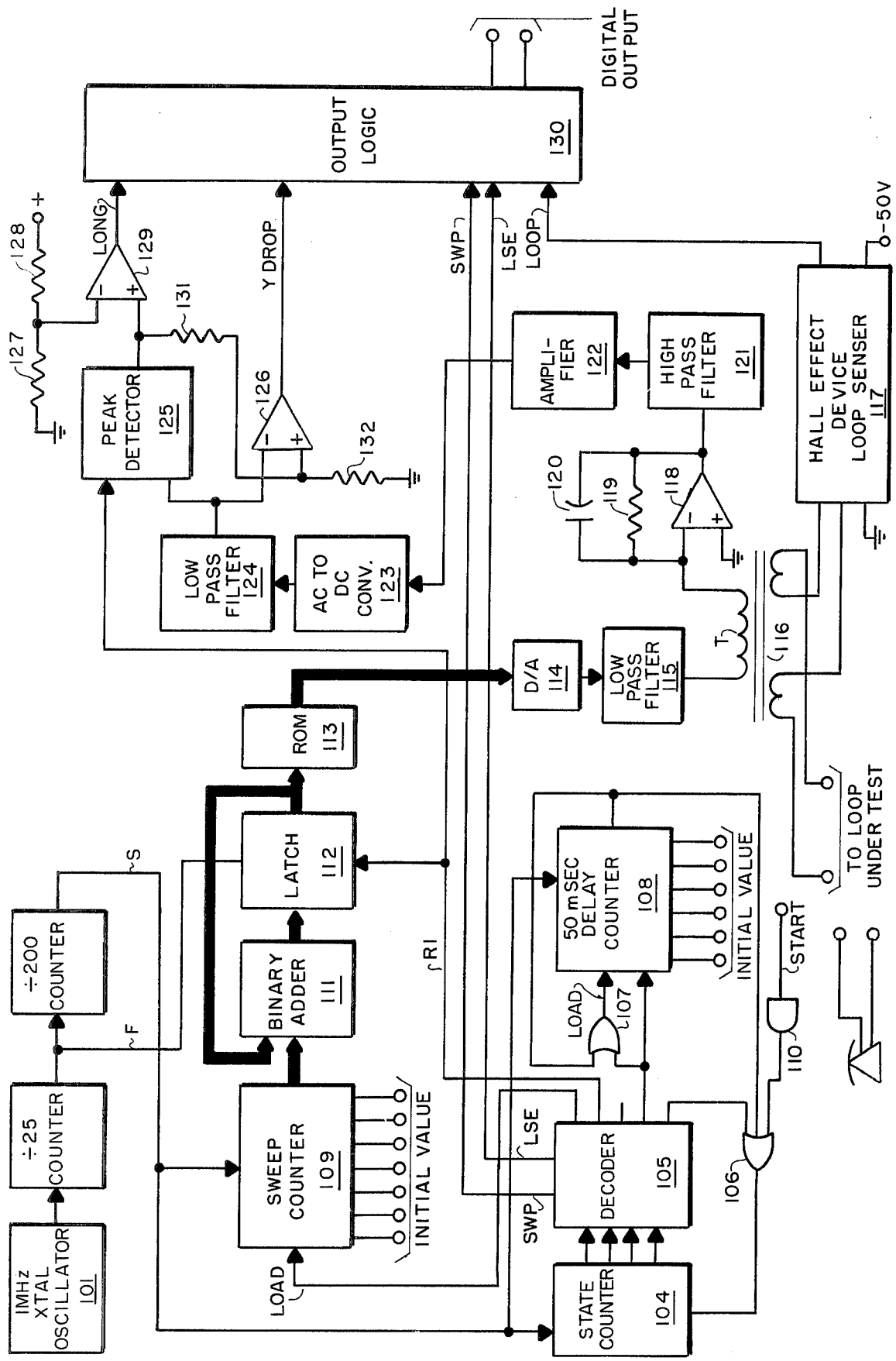

CABLE LOAD STATUS DETECTOR

FIELD OF THE INVENTION

This invention generally pertains to communication line testing and more particularly to testing such lines to automatically determine if they are loaded or unloaded.

BACKGROUND OF THE INVENTION

Analog central offices generally employed 2 wire switching through the office and therefore had no 2 to 4 wire hybrids associated with the line circuits. When 4 wire trunks were used, entering or leaving the office, a 2 to 4 wire hybrid was incorporated into the trunk circuit and was designed to match against a compromise loop network which took into account both loaded and non-loaded loops as seen through the circuitry of the central office. Due to the fact, that loss was deliberately incorporated into the trunk to implement the office loss plan, and also due to the loss encountered through the 2 wire portion of its office, the appropriate match obtained through the compromise network was adequate.

Digital local offices are inherently 4 wire even on local calls, and have a greater time delay than analog offices. Both factors contribute to a higher return loss requirement, which in turn requires either better matching between the compromise network and the loop, or intentionally inserted loss on local calls, or a combination of both. Some approaches to this problem have included the insertion of a loss into local calls or have attempted to come up with a closer compromise value for the matching network. This approach sets an upper limit on the return loss that can be obtained due to the wide impedance variations between loops. In another attempt to avoid these problems a separate matching network for loaded and non-loaded loops is used. This is based on a desire to avoid inserting loss on local calls and a recognition of the fact that loaded loops tend to cluster around a particular value of impedance while non-loaded loops cluster around a different value. For this reason, each line circuit must be individually adjusted to use either the loaded or non-loaded matching network. The disadvantages of this scheme are the labor needed to strap each line circuit individually to use the proper networks, and the need for accurate office records to determine which network should be used. Office loop records are often either inaccurate or inconveniently arranged for this purpose.

Automatic measurement of the characteristics of the loop would be the ideal situation, but some problems must be solved to provide this. Time Domain Reflectometry is often used to measure the characteristics of transmission lines, but this technique does not always clearly differentiate between different types of line discontinuity (bridge tap, load coil, change of wire gauge, etc.) and also requires the application of wideband pulses to the loop. Because much of the energy of these pulses lies outside the audio band of interest, problems can develop with interference to other devices and questionable validity of the measurements, in addition to the difficulty of automatically interpreting the results.

Manual test equipment is also available which applies an audio frequency sweep to the loop and displays either the loop impedance or return loss vs. frequency. Unfortunately, not only is this equipment bulky and expensive, but it is manually operated and requires human interpretation of the test results, which do not by themselves give a clear cut indication of loaded or non-loaded loop status. Another problem with these devices is that they cannot detect the status of DC loop supervision and they are incapable of detecting when test readings are incorrect due to subscriber access at the time of the tests.

Recently, at least one paper has been published (An Improved Adaptive Electronic Circulator for Telephone Applications, H. Gazioglu, D. A. Homer, J. I. Sewell, IEEE Transactions on Communications, Vol. COM-27, No. 8, August 1979, pp. 1218-1224) that describes a telephone utilizing test tones at approximately 12 Hz, 5000 Hz, and 10,000 Hz to measure the resistance, capacitance, and rollover frequency of a telephone loop and to automatically adjust the hybrid impedance to obtain low sidetone levels. This device, however, senses only at the 3 frequencies mentioned and is inherently incapable of sensing the presence or absence of loading coils. Further, it looks at the line from the subscriber end of the loop, toward the C.0., rather than out from the C.0., and uses test tones outside the normal 200-3200 Hz pass band of telephony equipment.

Attempts have been made to perform automatic loop sensing using a single tone at a frequency above 3 kHz to determine loaded or non-loaded loop status. In addition to using out-of-band tones, this device requires an adjustment of the operating frequency depending on the loading plan used in the office. This opens an avenue for errors due to wrong settings and introduces additional complications in offices using more than one loading plan.

Other devices have attempted to use the incoming voice to drive an adaptive hybrid network while the loop is in use, but these suffer from drift and errors due to differences in the voices of different talkers and the lack of low frequencies in the incoming signals. Also these devices must be provided on a per-line-circuit basis, rather than as an infrequently used test device as is the present disclosure.

SUMMARY OF THE INVENTION

This invention utilizes the manner in which the admittance varies for a loaded versus a non-loaded line. This difference is measured, while a 1 kHz to 3 kHz upward frequency sweep is applied to the line. Then as the admittance of the loop changes with the increasing frequency, the admittance is measured. If the admittance rises smoothly as the frequency increases, the loop is non-loaded and the admittance is characteristic of an R-C circuit. If loading coils are present, the resonance effects between their inductance and the capacitance of the wires will cause the admittance to rise and fall as the frequency is swept upward. The "peaks and valleys" pattern of the loaded loop is distinguished from the smoothly increasing pattern on the non-loaded loop with the aid of an admittance detector, a peak-hold circuit, and a comparator. The admittance detector produces a DC voltage proportional to the loop admittance at the instantaneous frequency of the sweep. The peak-hold circuit is set to zero at the beginning of the sweep and holds the highest level reached since the start of the sweep. The comparator compares a predetermined fraction of the peak-hold output to the instantaneous output of the admittance detector. If the instantaneous output drops below the specified fraction of the previous peak value, this is taken as evidence that the sweep has come to an admittance "valley" and a "loaded" code is output from the device. A non-loaded loop gives a continuously rising admittance which results in the instant admittance output always being the highest yet seen. At the end of the sweep during which no "valleys" of admittance have been seen, the non-loaded code is output.

BRIEF DESCRIPTION OF THE DRAWING

The single FIGURE is a block schematic of the circuit organization illustrating the basic operating principles of the invention.

DESCRIPTION OF THE PREFERRED EMBODIMENT

The cable load status detector of the present invention consists of several functional blocks, as shown in FIG. 1. The time base and clock signals are generated by a 1 MHz crystal oscillator 101, a counter 102 with a division ratio of 25 which generates a fast clock F output with a 25 microsecond period, and a second counter 103 with a division ratio of 200 which generates a slow clock S output with a 5000 microseconds period. The fast clock signal, F, and the slow clock signal, S, are distributed to other portions of the circuitry.

Control of the cable load status detector is exercised by the state counter 104, decoder 105, OR gates 106, 107, and delay counter 108. When the lead EXTERNAL CONTROL is placed in the "0" state by external controls, the state counter is reset to "0" and the decoder outputs both the R1 and the R2 reset signals. When the lead EXTERNAL CONTROL goes to the "1" state, the test sequence begins with the first slow clock pulse S, which advances the state counter 104 to state 1. The sequence of states is shown in Table 1 and proceeds as shown unless the lead EXTERNAL CONTROL goes back to 0, in which case the state counter 104 is asynchronously returned to state 0. The decoder 105 brings out the leads necessary to control the remainder of the hardware during the test. The length of all states except 0 and 8, which are under control of the lead EXTERNAL CONTROL, and 3 and 6, which last long enough to allow the full 1-3 kHz frequency sweep to take place, is determined by the 50 msec. delay counter 108. Once the decoder has enabled the delay counter, the output OR gate 106 prevents the state counter 104 from passing to the next state until the sweep counter 109 has reached the end of the 1 to 3 kHz sweep (states 3 and 6). The duration and sequence of the other states is controlled by the 50 msec. delay counter 108 and the state counter 104 and decoder 105.

The sweep counter 109 is continuously preloaded to a binary value representing 1000 Hz by the signal LOAD from the decoder 105. When the signal LOAD is removed the sweep counter 109 counts up one step with each slow clock cycle of 5 msec. until it reaches a value equivalent to 3 kHz after 1025 msec. At that time AND gate 110 produces an output, indicating that the sweep sequence is finished and allowing OR gate 106 to enable the state counter 104 to step to the next state.

The actual output swept sine wave is synthesized by the binary adder 111, latch 112, read only memory 113, digital to analog converter 114, and low pass filter 115. The generation of the sine wave proceeds as follows: The output of the latch 112 is connected back to one input of the binary adder 111, while the other input of the binary adder is connected to the output of the sweep counter 109. Thus the input to the latch is the sum of the present contents of the latch 112 and the output of the sweep counter 109. When the reset lead R1 is inactive, each fast clock cycle increments the contacts of the latch 112 by an amount equal to the sweep counter 109 output. Because the latch 112 and binary adder 111 are both 12 bits wide in this particular application, this addition continues until the sum is greater than 4095 ($2^{12}-1$), at which time the sum "wraps around" through zero. If the input to the binary adder 111 from the sweep counter 109 is 1, then the latch 112 will advance one count with each fast clock cycle until it arrives back at 0 after 4096 counts. Thus the overflow occurs at a rate or frequency equal to the fast clock frequency (40 kHz in this instance) divided by 4096 or approximately 9.766 Hz. If the input were 2 instead of 1, it would take only 2048 fast clock cycles for overflow to occur, giving a frequency of 19.532 Hz, or double the frequency with an input of 1. The contents of the latch 112 are thought of as the instantaneous phase of a sine wave in units of 1/4096 of a cycle, and the output is applied to a read only memory or ROM 114 which contains the digital values of a sine wave for values of the phase. The ROM 113 output is thus a digital sine wave of frequency N * 9.766 Hz where N is the input to the binary adder 111 from the sweep counter 109. Since new samples are produced at a 40 kHz rate, the 1 kHz to 3 kHz sine wave out of the D/A converter 114 needs only to be smoothed by a simple low pass filter 115 which passes 1-3 kHz but rejects 40 kHz and above. The tone thus generated is applied to the loop under test via transformer 116 and to the remainder of the circuitry.

Admittance Receiver, High Pass Filter, and Amplifier

The operational amplifier 118 and resistor 119 and capacitor 120 comprise the ADMITTANCE RECEIVER which delivers a sinusoidal output proportional to the product of the amplitude of the audio test signal and the T to R driving point admittance reflected through transformer 116. The effect of the transformer 116 is negligible for all but the shortest telephone lines. High frequency noise output is reduced by the low pass network consisting of capacitor 120 and resistor 119. The resultant output from op-amp 118 is passed through a second-order unity-gain Butterworth high pass filter 121 to attenuate low frequency noise and lower order harmonics of power line pickup.

Amplifier 122 amplifies the signal output from the high pass filter 121 and also provides additional low frequency rejection.

AC to DC Converter and Low Pass Filter 124

The AC to DC converter 123 consists of a full wave rectifier implemented by two op-amps. This produces a pulsating DC output proportional to telephone line admittance. The low pass filter 124, follows the AC to DC converter and produces a substantially non-pulsating DC output proportional to telephone line admittance at the frequency of the audio signal.

Peak Detector

Prior to the beginning of each swept frequency admittance test, the peak detector 125 is reset by a logic low on lead RST for several milliseconds to remove past history in the peak detector 125 by discharging the high side of a storage capacitor to analog ground. During the test the peak detector 125 captures and holds the highest voltage level applied to the input, buffers it and places it on the output.

Output Comparators

There are two conditions necessary for the cable load status detector to output a LOADED indication:

1. One condition is that the instantaneous admittance voltage passing out of low pass filter 124 drops below a fixed percentage of the peak value determined by the peak detector 125 as the audio test frequency is swept upwards through its range.

Whenever this event occurs comparator 126 will set the line YDROP to a logic high. This will happen for LOADED telephone loops but also for short NON-LOADED ones whenever the transformed loop capacitive susceptance is less than the shunting inductive susceptance introduced by the transformer 116, and the inductance of the Hall Effect device in the loop sensor 117.

2. The second condition is that the peak detector 125 output exceeds a preset threshold before or during satisfaction of condition number one. The comparator threshold set by resistors 127 and 128 will not be exceeded by the highest admittance voltage presented by the peak detector 125 during the detection of decreasing admittance for the short NON-LOADED loops satisfying condition one.

Comparator 129 will be activated to place the LONG output line at a logic high for LOADED telephone lines and sufficiently LONG NON-LOADED ones. However there are no unloaded loops that can satisfy both conditions 1 and 2. Note that the instantaneous admittance voltage from the filter 124 could substitute for the peak detector 125 output in providing a suitable test input for comparator 129 yielding similar results because a "true" logic output from 129 will set an internal flip-flop in the output logic 130.

Loop Current Sensing

This circuit applies talking battery to the telephone line through a battery feed inductor and a loop sensor comprising circuit 117. This sensor 117 will drive the loop sensor output to a logic low when enough DC current flows through the line being tested signaling either an "off-hook" condition or excessive DC loop current leakage.

Output Logic

If the lead YDROP becomes true during the 1 to 3 kHz frequency sweep, it is latched into an internal flip-flop. In the lead LONG also becomes true during the sweep, a LOADED indication is stored for the loop. Otherwise, a NON-LOADED indication is stored. If the second sweep reaches the same result as the first sweep, the stored LOADED or NON-LOADED indication is output. If the results of the two tests disagree, or if an off-hook condition is detected during the measurement by the Hall Effect device loop sensor 117, an INVALID TEST is output.

What is claimed is:

1. A system for testing a transmission line to determine if it is loaded or unloaded comprising:
   a digitally synthesized sweep frequency generating means having an output and comprising:
   a frequency standard oscillator;
   a first divider operated from said standard oscillator to output a first operating pulse output; and
   a second divider operated from said first operating pulse output to output a second operating pulse output;
   a sweep counter operated to output a count in response to said second operating pulse output;
   a binary adder including a first input operatively connected to said sweep counter output and a second input and including an output;
   a latch operatively connected to receive and temporarily store said binary adder output and including a latch output;
   said latch output operatively connected to said binary adder second input, whereby said latch is incremented by an amount equal to said sweep counter output;
   memory means operatively connected to said latch output to output a digital sine wave; and
   digital to analog converter means operated in response to said digital sine wave to produce an analog signal of a corresponding frequency as an output;
   line coupling means connecting said sweep frequency generating means output to a line to be tested;
   admittance measuring means connected to said line coupling means and operated to output an indication of the admittance level during the frequency sweep of said sweep frequency generating means; and wherein said admittance measuring means comprises:
   a first signal amplification means comprising a first amplifier having an input and an output with said line coupling means connected to said first amplifier input;
   a high frequency pass filter including input and output terminations, with said input termination connected to said first amplifier output;
   a second amplifier having an input and an output with said high frequency pass filter output termination connected to said second amplifier input;
   an alternating current to direct current conversion means operatively connected to said second amplifier output to produce a direct current output corresponding to an input alternating current level;
   a peak detector operated upon receipt of a signal to retain an indication of the highest input signal level; and
   other connect means operative to operatively connect said peak detector to said alternating current to direct current conversion means output;
   admittance evaluation means connected to said admittance measuring means and operated to indicate a loaded line upon said admittance measuring means measuring a dip in the admittance level.

2. A system as claimed in claim 1, wherein said line coupling means comprises a transformer including a first winding having a first and a second terminal, and second winding means, said first terminal operatively connected to said sweep frequency generating means, and said second terminal operatively connected to said admittance measuring means, said second winding means connected to a line to be tested.

3. A system as claimed in claim 2, wherein said line coupling means includes a battery feed arrangement connected through said second winding means for supplying an operating potential to a line being tested.

4. A system as claimed in claim 3, wherein said battery feed device includes a Hall effect current detector operated upon connection to a busy line to provide third signal indicating a closed loop condition.

5. A system as claimed in claim 3, wherein said battery feed device includes a Hall effect current detector operated upon connection to a busy line to provide a third signal to indicate a closed loop condition; and other logic means in said output logic operated in response to said third signal to output a digital indication of the results.

6. A system as claimed in claim 1, wherein said other connect means includes a low pass filter.

7. A system as claimed in claim 1, wherein said admittance evaluation means comprises:

a first comparator operatively connected to compare said peak detector indication against said alternating current to direct current conversion means output and to output a first signal upon finding a drop in level below the peak detector indication, thus indicating a loaded line.

8. A system as claimed in claim 7, wherein said admittance evaluation means further comprises:

a second comparator operatively connected to compare said peak detector indication against a reference level and to output a second signal upon said peak detector indication exceeding the reference level, thus indicating a long line.

9. A system as claimed in claim 8, wherein said admittance evaluation means further comprises:

output logic responsive to said first and said second signals to output a digital indication of the results.

10. A system as claimed in claim 9, wherein said line coupling means includes a battery feed arrangement connected through said second winding means for supplying an operating potential to a line being tested.

* * * * *